Aug. 25, 1936.  A. R. LUKENS  2,052,357

APPARATUS FOR TESTING MOLDED ARTICLES FOR FLOW LINE FAULTS

Filed Aug. 5, 1933  3 Sheets-Sheet 1

Inventor.
Alan R. Lukens
by Heard Smith & Tennant
Attys.

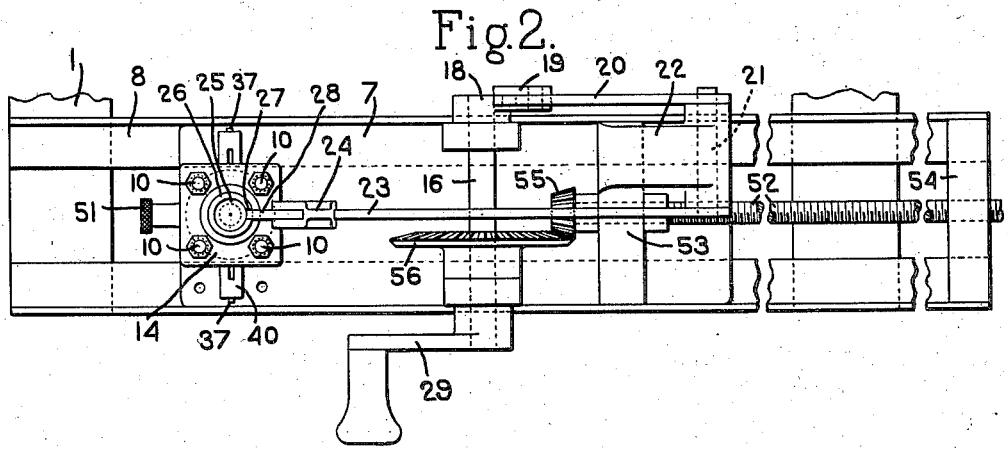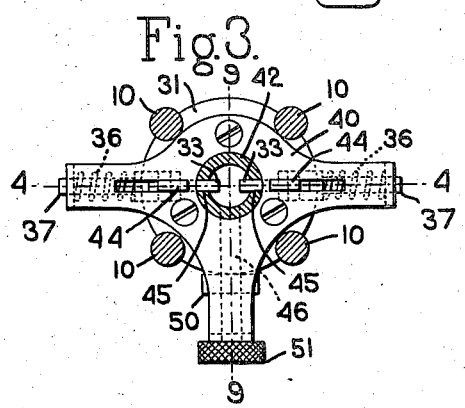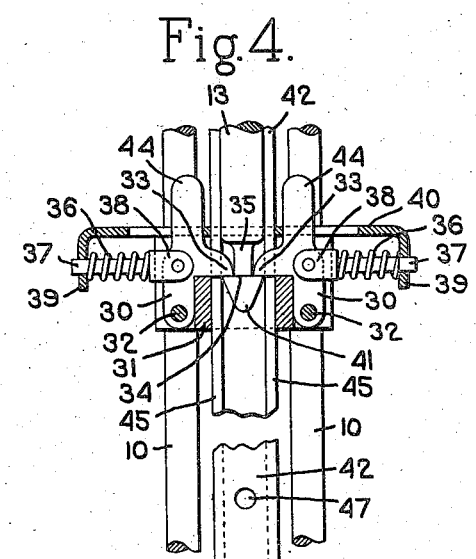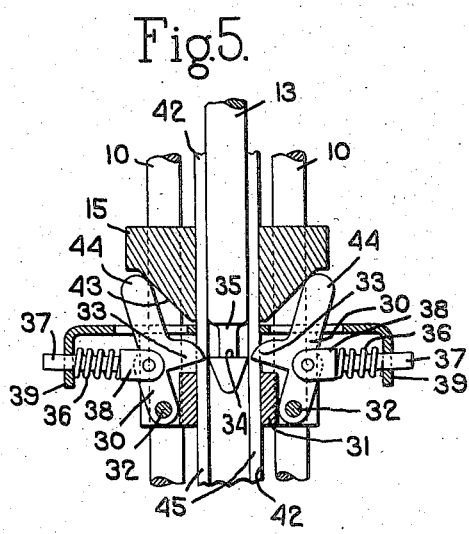

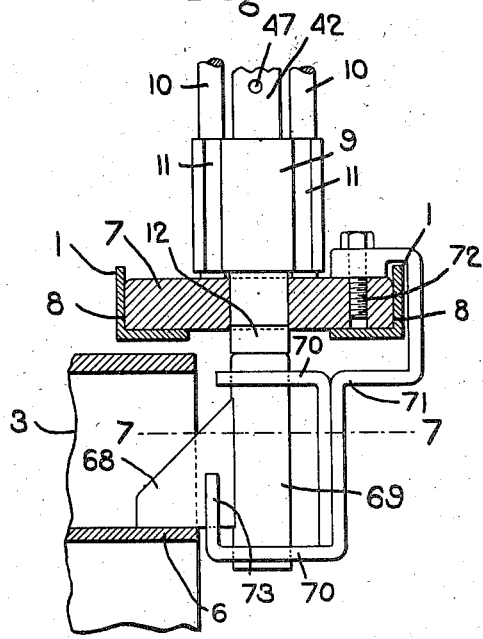
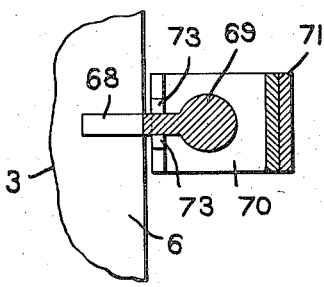
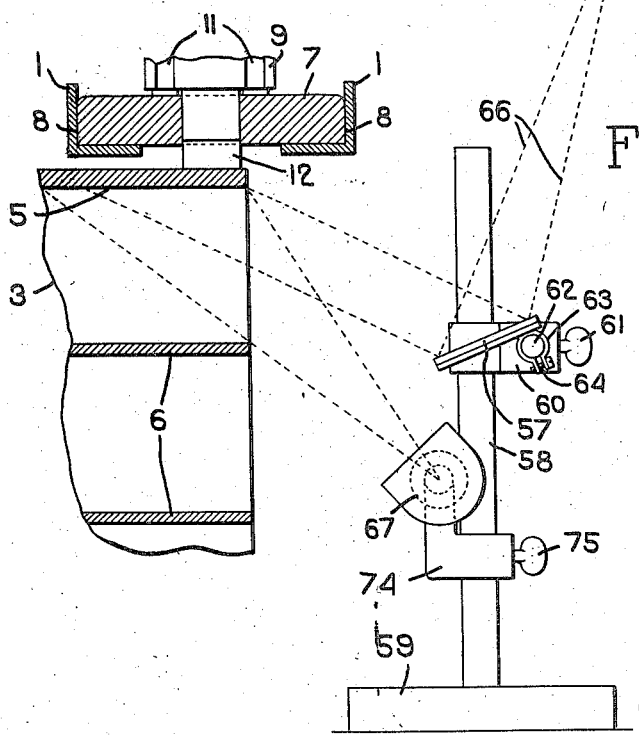
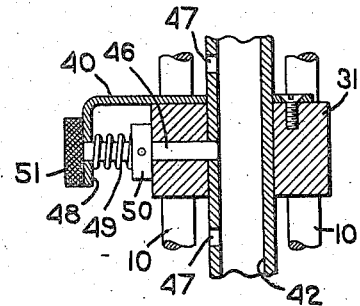
Inventor.
Alan R. Lukens

Patented Aug. 25, 1936

2,052,357

UNITED STATES PATENT OFFICE 2,052,357

APPARATUS FOR TESTING MOLDED ARTICLES FOR FLOW LINE FAULTS

Alan R. Lukens, Belmont, Mass.

Application August 5, 1933, Serial No. 683,800

7 Claims. (Cl. 73—51)

This invention relates to an apparatus for testing articles molded from thermoplastic material to determine the presence or absence of so-called "flow lines" in the molded articles.

The embodiment of the invention herein illustrated has been especially designed for testing molded battery containers, but the invention is equally applicable for testing any article which has been molded from thermoplastic material.

In molding an article from thermoplastic material, the said material tends to flow more freely into the mold cavities of larger cross-sectional area than into the mold cavities of smaller cross-sectional area. As a result, when a mass of thermoplastic material is subjected to the molding pressure it will first flow into and fill the mold cavities of larger cross-sectional area before the mold cavities of smaller cross-sectional area are filled, and in completing the molding operation there will be a transverse flow of material from the mold cavities of larger cross-sectional area to the mold cavities of smaller cross-sectional area. This transverse flow results in the formation of so-called "flow lines" because where two flowing masses of thermoplastic material of some types meet, the material of the two masses does not knit together perfectly along the line of junction so that this line of junction constitutes a line of weakness in the completed article. Where the article being molded is a battery container, such flow lines or lines of weakness may be of such a character as to render the container unfit for use because of the liability of the container to leak or become broken at the flow lines.

The existence of such flow lines is not always apparent by an optical inspection of the completed articles, but if flow lines do exist in the walls of a battery container or similar article, they can be developed by striking the wall a series of hammer-like blows.

It is one of the objects of my present invention to provide a novel apparatus which is designed to deliver these hammer-like blows against the wall of a battery container or other similar receptacle for the purpose of developing the existence of flow lines.

Another object of my invention is to provide a testing apparatus of this type which is constituted to deliver a series of blows along the edge of the battery container in spaced relation to each other and also to provide a novel construction by which the force of the blows can be readily adjusted.

In using the apparatus, it is first set to deliver relatively light blows and if such blows do not develop any flow lines the apparatus is set to deliver somewhat harder or more forceful blows. A flow line which is not developed by relatively light blows may be developed by the delivery of the more forceful blows. If these more forceful blows do not develop any flow lines, then the apparatus is set to deliver still harder blows or impacts and this operation is repeated up to the maximum blow which the machine is capable of delivering or until a flow line develops.

The testing apparatus thus enables tests to be made not only to discover the existence of flow lines in battery containers or other molded articles but also to indicate the character and location of these flow lines.

In order to give an understanding of the invention, I have illustrated in the drawings a selected embodiment thereof which will now be described after which the novel features will be pointed out in the appended claims.

In the drawings:

Fig. 2 is a top plan view of the machine;

Fig. 3 is an enlarged section on the line 3—3, Fig. 1;

Fig. 4 is a section on the line 4—4, Fig. 3;

Fig. 5 is a sectional view showing the manner of releasing the hammer;

Fig. 6 is a view showing an attachment designed for testing the partitions of battery containers;

Fig. 7 is a section on the line 7—7, Fig. 6;

Fig. 8 is a view illustrating the manner of optically locating flow line faults;

Fig. 9 is a section on line 9—9, Fig. 3.

Figure 1:
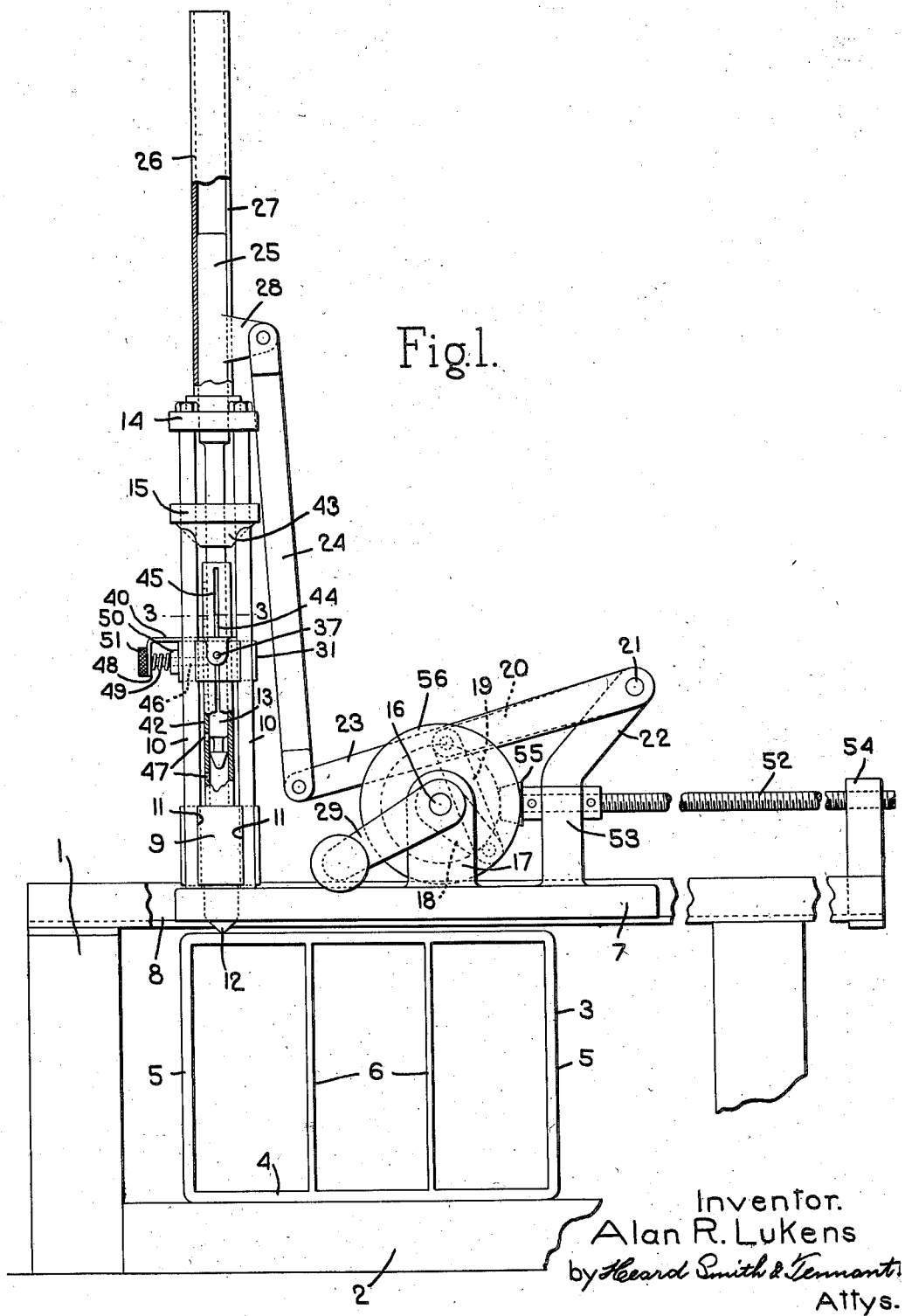
Fig. 1 is a side view of the machine embodying my invention.

The apparatus embodying the invention comprises a frame having means for supporting the battery container or other article to be tested, a hammer for giving the article a hammer-like blow and means to actuate the hammer for delivering blows at spaced locations along the wall of the battery container and also for delivering blows of different predetermined force.

The frame of the machine is indicated at 1 and it is shown as having a support or rest 2 on which the battery container 3, or other article to be tested, may be placed. The article to be tested is shown in the drawings as a battery container, which is formed with the usual side walls 4, end walls 5 and partition walls 6.

These battery containers are frequently molded of thermoplastic material, such as a mixture of bitumen, fibrous material, filler, etc.

Mounted on the frame 1 is a carriage 7 which is movable in ways 8 with which the frame 1 is provided. The hammer for giving the hammer-like blows to the container is shown at 9. This hammer is adapted to be raised from the carriage 7 and then dropped on the wall of the container 3, thereby to give the desired hammer-like testing blow. As herein shown, the hammer is guided in its vertical movement by a plurality of guiding posts 10 which rise from and are secured to the carriage 7, said hammer having guiding grooves 11 in its side walls in which the posts 10 are received. The striking end of the hammer is shown as being tapered to an edge 12 so that the force of the blow is delivered substantially along a line of impact.

The means for raising the hammer comprise a hammer-lifting rod 13 which is reciprocable vertically and is guided in its reciprocations by guiding heads 14 and 15 which are secured to the posts 10. This hammer-lifting rod is given a vertical reciprocating movement of fixed amplitude and means are provided for latching the hammer to the rod during its upward movement whereby the hammer is lifted and then releasing the hammer from the rod to allow said hammer to fall and impact against the battery container. The means for giving the hammer-lifting rod 13 its reciprocating movement comprises a shaft 16 journalled in suitable bearings 17 carried by the carriage 7 and having a crank arm 18 which is connected by a link 19 to an arm 20 fast on a rock shaft 21. The rock shaft 21 is journalled in a suitable bearing 22 mounted on the carriage 7 and it has rigid therewith another arm 23 which is connected to the upper end 25 of the hammer-lifting rod by means of a link 24. The upper end 25 of the hammer-lifting rod is received in a guide sleeve 26 which rises from the upper head 14, said sleeve having a slot 27 therein in which operates an ear 28 extending from the hammer-lifting rod 13 and to which the link 24 is pivoted. Each rotation of the shaft 16 will give the hammer-lifting rod a complete reciprocation of fixed amplitude. Any convenient means may be employed for rotating the shaft 16, and I have herein shown a handle 29 secured to one end of the shaft and by which it may be manually rotated.

The coupling of the hammer-lifting rod 13 to the hammer is accomplished by means of latches which automatically engage the lifting rod during its upward movement and which are automatically released just before the lifting rod reaches the upper limit of its movement. Two such latches are herein shown, they being indicated at 30. These latches are pivotally secured to a latch carrier 31 which is adjustably secured to a sleeve 42 that rises from and is rigid with the hammer 9. The lower end of the lifting rod 13 telescopes into the sleeve 42, as shown in Figs. 1, 4 and 5. The manner of adjustably connecting the latch carrier to the sleeve 42 will be presently described. The latches 30 are acted on by springs which cause them to be automatically latched to the upwardly-moving lifting rod 13. Each latch is pivoted to the latch carrier at 32 and is provided with an inwardly-directed nose 33 adapted to engage an upwardly-facing shoulder 34 with which the rod 13 is provided. This shoulder is conveniently formed by providing the rod 13 with a portion 35 of reduced diameter. Each latch is acted on by a spring 36 and, as herein shown, each spring is carried by a pin 37 which has a forked inner end 38 that embraces and is pivotally secured to one of the latches, the outer end of a pin extending through an opening formed in a flange 39 which extends downwardly from a guide plate 40 secured to the latch carrier 31. Each spring is situated between the corresponding flange 39 and the forked end 38 of the pin 37, and thus tends normally to move the corresponding latch inwardly.

The lower extremity of the lifting rod 13 is pointed, as indicated at 41. When the hammer-lifting rod 13 is moved downwardly the pointed end 41 thereof is crowded between the noses 33 of the latches, thereby forcing the latches backwardly against the action of the springs 36. The downward movement of the hammer-lifting rod carries the lower end thereof a greater or less distance below the latches 30 depending on the position on the sleeve 42 into which the latch carrier has been adjusted, and when during the ascent of the rod the portion 35 of reduced diameter comes opposite the noses 33 of the latches, said latches are forced inwardly by the springs 36 to cause them to engage the shoulder 34, as illustrated in Fig. 4. By this operation the hammer is latched to the rod 13 so that the further upward movement of the rod will carry the hammer with it.

Means are provided for releasing the latches from the rod 13 just before the latter reaches the end of its upward movement. For this purpose, the head 15 constitutes a latch-releasing head, it having the conical under face 43 with which the upper ends 44 of the latches are brought into engagement during the upward movement of the hammer. This engagement of the upper ends of the latches with the conical head 43 spreads the latches, as shown in Fig. 5, and thereby releases them from the shoulder 34. When this occurs, the hammer will drop by gravity, thereby delivering its hammer-like blow to the wall of the battery case.

It should be noted that the sleeve 42 is provided with slots 45 in which the noses 33 of the latches operate.

I have stated above that the latch carrier 31 is adjustably secured to the sleeve 42. This sleeve extends through the latch carrier and the latter is provided with a locking pin 46 which is adapted to engage any one of a plurality of apertures 47 formed in the sleeve 42. This locking pin 46 is partially supported by a flange 48 which also depends from the guiding plate 40 and is acted on by a spring 49 which tends to move it inwardly into locking position. This spring is confined between the flange 48 and a collar 50 fast on the locking pin and the latter is formed with a head 51 by which it may be manipulated. When the locking pin 46 is withdrawn from engagement with an aperture 47 in the sleeve 42, then said latch carrier 31 can be moved up or down on the sleeve 42 into any desired position, which position will be retained by re-engaging the locking pin 46 with one of the apertures 47. Assuming that the latch carrier is adjusted to a position near the upper end of the sleeve 42, then it will be observed that said latch carrier will not be automatically latched to the lifting rod until the latter has nearly completed its upward movement, the result being that only the last portion of the upward movement of said rod will be effective in lifting the hammer. On the other hand, if the latch carrier is adjusted to the lower end of the sleeve 42, then the latches will engage the lifting rod during the early portion of its upward movement and the hammer will have a correspondingly increased lift. The force of the blow delivered by the hammer depends, of course, upon the height from which it falls and this can be determined by adjusting the latch carrier 31 as above described.

The apparatus not only comprises means for lifting and releasing the hammer as above described but also means for giving the carriage and hammer a relative feeding movement so that the successive hammer blows will be delivered at spaced points along the wall of the battery container. While any suitable means for providing this feeding movement may be employed, I have herein shown mechanism for moving the carriage as the blows are delivered. This is accomplished by means of a feed screw 52 which is journalled at one end in a bearing 53 mounted on the carriage and has screw-threaded engagement with a nut 54 that is mounted on the frame I. Means are provided for rotating the screw 52 from the shaft 16 and for this purpose said screw has a bevel pinion 55 fast thereon which meshes with a beveled gear 56 fast on the shaft 16. Each rotation of the shaft 16, therefore, operates to lift and release the hammer and also rotates the feed screw 52, thereby moving the carriage 7 forward. The speed of the feeding movement depends, of course, upon the relation of the gears 55 and 56. For testing battery containers, I propose to use a set of gears which will advance the carriage about a quarter of an inch for each rotation of the shaft 16 so that the successive hammer-like blows will be delivered at points about a quarter of an inch apart.

In using the apparatus, the battery container is placed in position as shown in Fig. 1 and the latch carrier 31 will be adjusted so as to cause the hammer to deliver a relatively light blow. In practice, I find that good results are secured by so adjusting the latch carrier that the hammer will be lifted about an inch for the first application of the hammer-like blows. Having made this adjustment, the crank 29 is rotated with the result that the hammer will be repeatedly lifted and the carriage 7 will be advanced so that the successive hammer-like blows will be delivered along the edge of one wall of the battery container. During the delivery of these hammer-like blows, the operative observes the wall to see whether any cracks develop as a result of the blows. Such cracks will develop in places where the flow lines are located.

If during the first pass across the side of the battery container no flow lines are developed, then the latch carrier 31 will be adjusted downwardly so that at each operation of the rod 13 the hammer will be lifted to a greater extent, say two inches. The device is then actuated to produce the series of spaced hammer-like blows along the edge of the battery container, each blow having an increased intensity because of the fact that the hammer is dropped from a greater height. During this operation the operative also observes the condition of the battery container to see whether any cracks are developing.

In carrying the test further, the operative will adjust the latch carrier 31 still further downwardly so that at each operation of the hammer-lifting rod the hammer will be lifted a still greater distance, say three inches. The above operation will then be repeated by delivering a series of blows with a three inch hammer drop along the wall of the battery container. If further tests are desired, the latch carrier can be still further adjusted downwardly and the operations repeated until finally the adjustment is such as to give the hammer the maximum lift.

To assist the operative in locating the presence and position of cracks which develop under the hammer blows because of flow line faults, I prefer to use the apparatus shown in Fig. 8.

This comprises a reflector arrangement, by which the operative is enabled readily to see the under side of the wall against which the hammer is striking its blows. This reflector apparatus comprises a reflector 57 adjustably mounted on a post 58 which rises from a base 59. This post and base are situated in front of the battery container 3 and the reflector 57 is adjusted so that the operative can readily observe in the reflector an image of the under face of the wall 5 of the battery. The reflector is shown as carried on a block 60 which is adjustable vertically on the post 58 and is locked in adjusted position by means of a set screw 61. The reflector is also shown as carried by the block 60 in such a way as to permit it to be turned about a horizontal axis. This block 60 has a supporting stud 62 extending from it which extends through a hub 63 carried by the reflector. This hub can be clamped to the pin by means of a clamp screw 64 and when the clamp screw 64 is loosened the reflector can be readily turned into different angular positions.

This double adjustment provides means whereby the reflector can be placed so as to give the desired reflected image of the under side of the wall 5. In Fig. 8, the eye of the observer is indicated at 65 and the dotted line 66 shows how the observer sees in the reflector 57 the image of the under side of the wall 5. 67 indicates an electric lamp, also adjustably mounted on the post 58 and by which the under face of the wall 5 may be illuminated so that the presence of cracks formed therein may be more easily observed.

The discovery of the presence of any cracks may also be facilitated by rubbing chalk on the under face of the wall 5. The coating of chalk shows up the development of any cracks.

For testing the partitions 6, I propose to use the attachment used in Figs. 6 and 7. This comprises a supplemental hammer 68 which is in the form of a wing extending from a pin 69 that is supported in arms 70 of a bracket 71. This bracket 71 is adapted to be attached to the carriage 7 by means of a screw 72, and when it is so attached the body or pin portion 69 of the supplemental hammer is directly underneath and in line with the hammer 9. For testing the partitions, the battery container is turned on its end so that the partitions extend horizontally, and said container is then in position so that the wing portion 68 will rest on the partition, as shown in Fig. 6. Each time the hammer is actuated it drops on to the body 69 of the supplemental hammer, thereby delivering the blow to the partition 6. The development of any cracks in the partitions 6 due to flow line faults can be observed in the manner shown in Fig. 8.

The bracket 71 is provided with two upstanding fingers 73 between which the wing 68 extends. These fingers serve to hold the wing 68 in proper position and prevent the pin 69 from turning about its axis.

The lamp 67 shown in Fig. 8 is adjustably mounted on the post 58. This lamp is shown as mounted on a bracket 74 which is adjustable vertically on the post 58 and is held in adjusted position by the set screw 75.

Having thus described the invention, what is claimed as new, and desired to be secured by Letters Patent, is:

1. A device of the class described comprising a supporting frame having means to support the article to be tested, a carriage movably mounted on the frame, a hammer element on the carriage, means to repeatedly raise the hammer and then release it, thereby allowing it to drop and strike the article, and means to feed the carriage forward so that successive blows are delivered on the article at spaced points.

2. A device of the class described comprising a supporting frame having means to support the article to be tested, a carriage movably mounted on the frame, a hammer mounted on the carriage, means to repeatedly raise the hammer and then release it, thereby allowing it to drop and strike the article, means for feeding the carriage to cause successive hammer blows to be delivered at spaced points on the article and a common actuator for both the hammer raising means and the feeding means.

3. A device of the class described comprising means for supporting the article to be tested, a hammer element, a vertically reciprocating hammer-raising rod, means to give said rod a reciprocation of a fixed amplitude, adjustable means for coupling the hammer to the rod during each rising movement thereof and then automatically releasing the hammer also during the same rising movement of the rod, thereby permitting it to drop and strike the article, and means to produce a relative feeding movement between the article and the hammer whereby successive hammer blows strike the article at spaced points.

4. A device of the class described comprising supporting means for the article to be tested, a hammer element, a vertically reciprocating hammer-raising rod having a reciprocating movement of fixed amplitude, a latch device for coupling the hammer to the rod during its upward movement, means to release the latch device at a fixed point in the upward travel of said rod, said latch device being adjustable vertically relative to the hammer to provide for coupling the hammer to the rod at different points in the upward movement of the rod.

5. A device of the class described comprising means for supporting the article to be tested, a hammer element, a vertically-reciprocating hammer-raising rod, means to give said rod a vertical reciprocation of a fixed amplitude, means for automatically coupling the hammer to the rod during the rising movement of the latter, and for releasing the hammer from the rod during the same continued rising movement, said means being adjustable vertically to provide for coupling the hammer to the rod at different points in said rising movement.

6. A device of the class described comprising means for supporting the article to be tested, a hammer element, a vertically-reciprocating hammer-raising member, a latch device connected to the hammer element for adjustment relative thereto in the direction of the movement of the hammer-raising member and by which the hammer element is coupled to the hammer-raising element during the rising movement thereof, the adjustability of the latch device providing for coupling the hammer to the hammer-raising element at different points in its rising movement.

7. A device of the class described comprising means for supporting the article to be tested, a hammer element, a vertically-reciprocating hammer-raising member, a latch device connected to the hammer element for adjustment relative thereto in the direction of the movement of the hammer-raising member and by which the hammer element is coupled to the hammer-raising element during the rising movement thereof, the adjustability of the latch device providing for coupling the hammer to the hammer-raising element at different points in its rising movement and means to release the latch device during each rising movement of the hammer-raising element.

ALAN R. LUKENS.